UNITED STATES PATENT OFFICE.

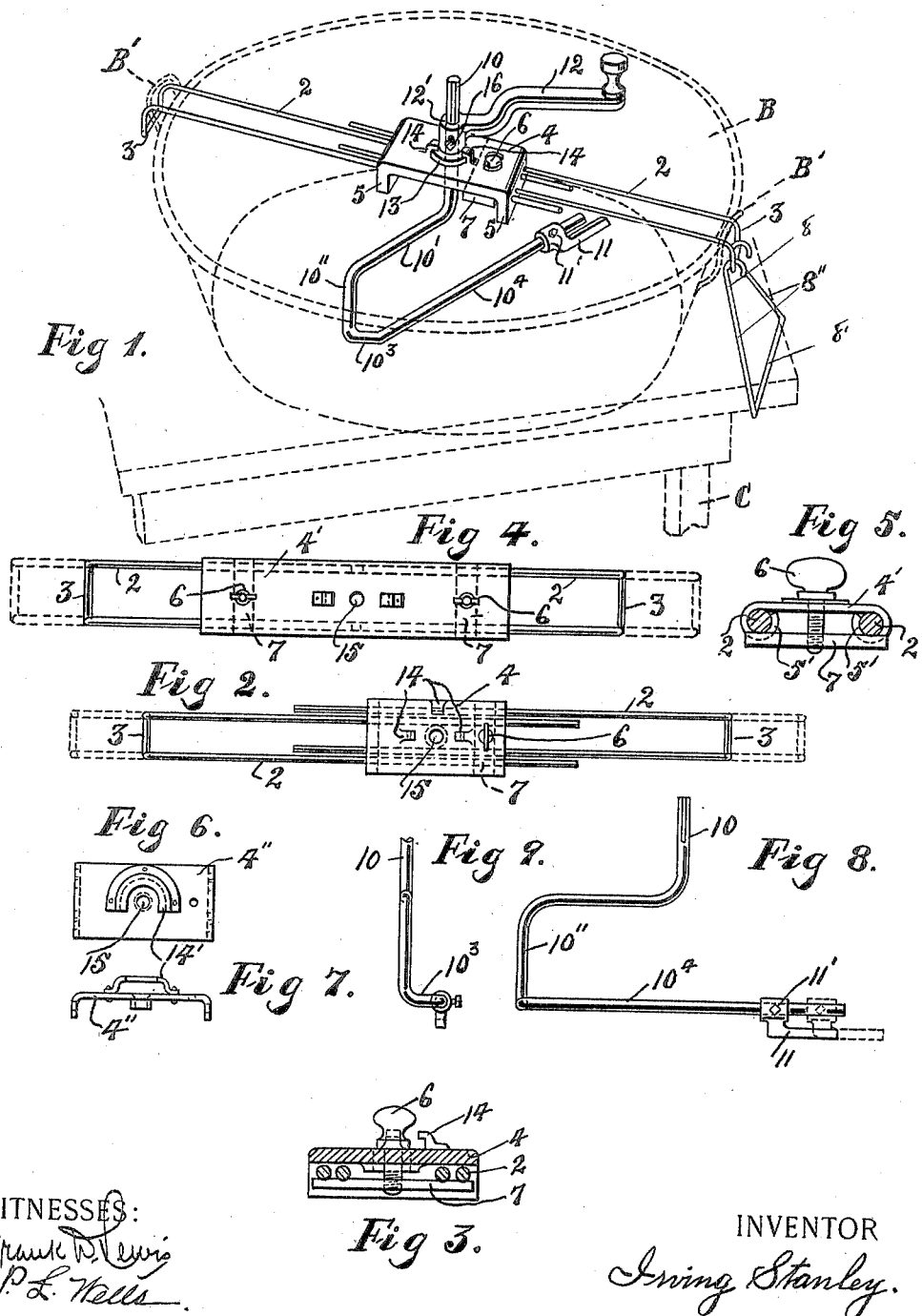

IRVING STANLEY, OF NEW YORK, N. Y.

DOUGH OR BREAD MIXER.

No. 817,400.  Specification of Letters Patent.  Patented April 10, 1906.

Application filed April 15, 1905. Serial No. 255,781.

*To all whom it may concern:*

Be it known that I, IRVING STANLEY, a citizen of the United States, residing in the borough of Manhattan, in the county of New York and State of New York, have invented a new and useful Improvement in Bread or Dough Mixers, of which the following is a specification.

This invention is designed to furnish an effective and economical construction for a dough or bread mixer; and, among other things, it provides an article of this character with features of adjustment that enable it to be easily and quickly applied to the vessel in conjuction with which it is to be used.

As illustrated, the mixer embodies a structure intended to be used as an attachment for application to a pan or other receptacle, the particular features of the invention residing in the inexpensive construction and means whereby it is adapted to be readily mounted upon receptacles of different sizes.

A further feature of the invention relates to means for holding the receptacle, together with the attachment mounted thereon, upon a table or other support with rigidity sufficient to permit the mixing operation to be effectively performed.

The mixer embraces a bridge member adapted to be supported upon opposite sides of the receptacle. This member may beneficially be adjustable to adapt it to vessels of different diameters, and for the sake of cheapness it may be formed of reversely-bent wires or rods having at their ends catches or keepers adapted to fit over the edges of the receptacle. The bridge member supports a bearing-piece for the shaft of the stirring-arm, this shaft being preferably capable of adjustment depthwise of the receptacle. This shaft is secured to a hand-crank. Means are provided for holding the shaft and crank against longitudinal movement relative to the bearing-piece, at the same time leaving the parts free for rotation and ready adjustment. The bridge member is suitably formed to engage with a holding-down device, which is constructed and arranged in such manner that it may be conveniently slipped on a corner of the table to hold down one end of the bridge member or the receptacle to which it may be attached. This with the pressure of the hand of the operator on the opposite side of the apparatus suffices to retain the parts against displacement during the mixing operation. Preferably, also, the arm carries an adjustable auxiliary arm whereby the effective length of the mixing-arm may be altered.

In the drawings accompanying the present specification, Figure 1 illustrates a perspective view of a mixer embodying the present improvements, the receptacle or dough-pan and a part of a supporting-table being shown in dotted outline. Fig. 2 illustrates a plan view of the bridge member of Fig. 1, the operating-handle and mixing-arm shaft being removed and the dotted lines at the ends indicating the longitudinal extensibility of the bridge member. Fig. 3 illustrates a cross-sectional view, the scale of this figure being somewhat larger than that to which Fig. 2 is drawn. Figs. 4 and 5 illustrate views similar to Figs. 2 and 3, respectively, but showing a modified construction. Figs. 6 and 7 illustrate plan and edge views, respectively, of a modified construction for retaining the relatively-adjustable mixer-arm shaft and operating-handle against longitudinal movement when affixed one to the other. Fig. 8 is an elevational view of the mixer-arms and their shaft, showing the adjustable auxiliary mixer-arm. Fig. 9 illustrates a view looking from the left of Fig. 8.

Similar characters of reference designate corresponding parts in all the figures.

The mixer-arm is characterized by cheap and simple features of adjustment applicable for the most effective use under various conditions—such, for instance, as different quantities of dough, pans or receptacles of different diameters and depths, &c. Economy of manufacture is thus facilitated, not only by reason of simplicity of construction, but also by reason of the capacity for adjustment, for by adjustment the mixer may be made to meet a wide range of conditions.

The present mixer is essentially an attachment or appliance capable of coöperation with the ordinary pan of the kitchen and is especially designed to this end, as will appear from the following description.

The mixer embraces a bridge member having at each end a transversely-extending catch or keeper and capable of adjustment to vary the distance between these catches. Specifically the bridge member comprises two parts, each consisting of a tongue 2, made in the illustrated construction of a rod or wire bent upon itself and having its closed end turned over to form a catch or keeper 3. This bridge member supports a bearing-piece 4, in Figs. 1 and 2, or 4′, in Figs. 4 and 5, for the mixer-arm shaft, the free ends of the rods constituting the bridge member being slidably mounted in openings in the bearing-piece. In Figs. 1 and 2 the rods are disposed side by side, passing through openings in the transversely-bent ends 5 5 of the bearing-piece, while in Figs. 4 and 5 the two rods of the bridge member are disposed in line with each other and located in sockets formed by the turned-in longitudinal edges 5′ 5′ of the bearing-piece. This construction, it is evident, permits the hooks or catches 3 3 by adjustment to be engaged with the sides of the pan designated by B. Preferably the bridge member is inserted between the handles B′ B′ of the pan, whereupon by pushing together the parts of the bridge member the catches on the latter may be engaged with the pan edge. The parts may be firmly clamped together by means of a thumb-screw 6, which enters a tapped hole in a strap 7, extending crosswise below the bridge parts and impinging against the exposed surfaces of the rods. In the construction illustrated in Figs. 4 and 5 two such straps and thumb-screws are shown.

It is intended in the operation of the mixer that the pan with the mixer mounted thereon shall be held against displacement by some simple means—for instance, one of the catches 3 may engage with a link 8, slipped over the corner of the supporting-table C, and when so held the pressure of the hand on the opposite side of the bridge member will preclude shifting. Link 8 comprises a cross-bar 8′, adapted to engage with the under surface of the table, from which cross-bar extend side members 8″ 8″.

The mixer proper embodies one or more mixer-arms carried by a shaft rotatably mounted in the bearing-piece. The parts here include an axial part or bearing-shaft 10, provided with a radial mixer-arm 10′, an axial extending part 10″, an offset portion $10^3$, and a radial mixer-arm $10^4$. In order to vary the effective length of this latter arm, the same is here provided with an auxiliary arm 11, adjustable along arm $10^4$ and attachable thereto in its adjustable position by means such as a set-screw 11′.

An operating-handle is designated by 12, and it is provided with a hub portion 12′, bored to receive the axial part 10 of the shaft. Inasmuch as the depth of the amount of dough to be operated upon may vary, as well as the depth of the pan upon which the appliance is mounted, the shaft is preferably adjustable depthwise of the pan—that is, lengthwise of the axial part 10 of the shaft. Simple means are illustrated for permitting of this adjustment relatively of the hand-crank 12 and which at the same time operates to confine the hand-crank with the adjusted and attached shaft to a rotative movement. This means comprises a laterally-extending annular lip 13, rigid with the hub portion of the hand-crank 12 and working under an overhanging part or keeper on the bearing-piece 4. This keeper consists in Figs. 1 and 2 of undercut lugs 14, extending from the upper part of the bearing-piece. To permit the withdrawal of the hand-crank from engagement with the lugs after the axial part 10 has been withdrawn from the bore of the hub portion of the arm, the lugs all lie substantially on one side of a diameter, leaving the lip 13 free to be withdrawn at the opposite side.

The modified construction illustrated in Fig. 6 embraces a bearing-piece 4″ of sheet metal, to which is attached a semicircular overhung flange 14′, functioning in a similar manner to the retaining-lugs already described.

In assembling the mixer-arm shaft and the hand-crank the latter may be positioned by sliding the lip 13 under its keeper until the bore of the hub alines with the opening 15 in the bearing-piece, after which the axial part of the shaft may be slid into place and secured in the desired position to the crank-arm 12 by a set-screw 16.

I claim—

1. In a dough-mixer the combination of a bridge member comprising two pairs of parallel rods or wires, each pair having at its outer end catches adapted to fit over the edges of the receptacle and the other ends passing through a bearing-piece, the bearing-piece itself, a shaft mounted upon the bearing-piece, a hand-crank for operating the shaft, a dough-pan with which the bridge member is adapted to engage and means for securing the bridge member to the table or support.

2. In a dough-mixer the combination of a bearing-piece, a bridge member comprising two rods or wires each bent upon itself so as to form two parallel ends or members, each having catches at their outer ends adapted to fit over the edge of the receptacle, the inner ends of said wires engaging with the bearing-piece, means for clamping said bearing-piece and bridge member together in any adjusted position of the parts, a hand-crank, a shaft and a mixer-arm extending from the shaft.

3. In a dough-mixer the combination of a bridge member consisting of two rods or wires each bent upon itself and formed with a transversely-extending catch at its end, holding means adapted to engage with one of said catches and with the pan-support, a bearing-piece with which the rods or wires of said bridge member have a slidable connection, a binding-strap mounted on the bearing-piece, a tightening-screw and a mixer-arm.

4. In a dough-mixer the combination of a bridge member, a bearing-piece, a shaft mounted in said bearing-piece and provided with a mixer-arm, a hand-crank with the bore of whose hub said shaft has a longitudinal adjustable connection, means for holding said shaft in its position of longitudinal adjustment in the bore of said hub and means extending from said bridge member confining said crank to a rotary movement and preventing its movement axially of said shaft.

5. In a dough-mixer the combination of a bridge member, a bearing-piece, a mixer-arm shaft mounted in said bearing-piece, a hand-crank through the bore of whose hub said shaft is slidably adjustable and means comprising a radially-extending lip rigid with the hand-crank and a keeper on the bearing-piece for confining the hand-crank and the attached shaft to a rotary movement, the hub of said crank being laterally removable from under said keeper when said shaft has been removed from the crank-hub.

6. In a dough-mixer the combination of a shaft provided with a mixer-arm, a bearing-piece in which the axial portion of said shaft is mounted, a hand-crank whose hub portion is provided with a radially-extending lip and a keeper on the bearing-piece coöperating with said lip, said keeper lying substantially on one side of a diameter and a shaft having a sliding connection with the hand-crank whereby the mixer-arm may be adjusted depthwise and the hand-crank disconnected after the withdrawal of the shaft.

7. In a dough-mixer the combination of a shaft provided with a mixer-arm, a bridge member consisting of two reversely-bent wires formed with catches at the ends of the bridge member, a link connection with one of said catches adapted to engage with a corner of the supporting-table, a bearing-piece provided with a keeper and a hand-crank through the bore of whose hub said shaft is slidable and whose hub is provided with a radial lip adapted to coöperate with said keeper.

8. In a dough-mixer the combination with a hand-crank, a shaft, and a mixer-arm, of a bearing-piece, and a bridge member comprising two rods or wires each bent upon itself and engaging with said bearing-piece, one rod at one side of the bearing-piece and the other rod at the opposite side thereof.

9. In a dough-mixer the combination with a hand-crank, a shaft, and a mixer-arm, of a bearing-piece, a bridge member comprising two rods or wires each bent upon itself and slidably engaging with said bearing-piece, one rod at one side of the bearing-piece, the other rod at the opposite side thereof, and means for clamping said rods and said bearing-piece together in the adjusted position of the parts.

10. In a dough-mixer the combination with a hand-crank, a shaft and a mixer-arm, of a bearing-piece provided with laterally-extending edges at opposite sides thereof, a bridge member comprising two rods or wires each bent upon itself and slidably engaging with said laterally-extending edges of the bearing-piece and means for clamping said rods and the bearing-piece together in the adjusted position of the parts.

11. In a dough-mixer the combination of a hand-crank, a shaft, a mixer-arm, a bridge member, a bearing-piece and a link adapted to engage with two sides of a table or like structure adjacent to a corner thereof, said link comprising a horizontally-disposed cross-bar adapted to engage with the under side of the table, and angularly-extending members integral with the cross-bar and projecting therefrom at each end, one of which engages with one side of the table adjacent to the corner and the other with an adjoining side thereof adjacent to the same corner.

In testimony whereof I have signed my name to this specification in the presence of two subscribing witnesses.

IRVING STANLEY.

Witnesses:
  CHAS. H. DAVIDS,
  PIERSON L. WELLS.